United States Patent
Abe et al.

(10) Patent No.: US 9,107,111 B2
(45) Date of Patent: Aug. 11, 2015

(54) NOTIFICATION METHOD, USER TERMINAL AND RADIO BASE STATION

(75) Inventors: Tetsushi Abe, Tokyo (JP); Mikio Iwamura, Tokyo (JP); Hideaki Takahashi, Tokyo (JP); Hiroyuki Ishii, Tokyo (JP); Satoshi Nagata, Tokyo (JP); Naoto Ookubo, Tokyo (JP); Nobuhiko Miki, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 121 days.

(21) Appl. No.: 13/883,356

(22) PCT Filed: Nov. 8, 2011

(86) PCT No.: PCT/JP2011/075657
§ 371 (c)(1),
(2), (4) Date: Sep. 11, 2013

(87) PCT Pub. No.: WO2012/063792
PCT Pub. Date: May 18, 2012

(65) Prior Publication Data
US 2013/0343270 A1 Dec. 26, 2013

(30) Foreign Application Priority Data
Nov. 8, 2010 (JP) .................... 2010-250144

(51) Int. Cl.
*H04J 1/16* (2006.01)
*H04W 36/00* (2009.01)
(Continued)

(52) U.S. Cl.
CPC .......... *H04W 36/0005* (2013.01); *H04W 48/12* (2013.01); *H04W 68/005* (2013.01); *H04W 36/04* (2013.01)

(58) Field of Classification Search
CPC . H04W 36/0005; H04W 36/04; H04W 48/08; H04W 68/005; H04W 28/26

USPC ................. 379/68–70, 74; 370/328
See application file for complete search history.

(56) References Cited

U.S. PATENT DOCUMENTS

2004/0028015 A1* 2/2004 Fouilland et al. ............. 370/337
2009/0316603 A1 12/2009 Amerga et al.
(Continued)

FOREIGN PATENT DOCUMENTS

WO 2010008844 A1 1/2010
WO 2010032477 A1 3/2010

OTHER PUBLICATIONS

Decision to Grant issued in Japanese Patent Application No. 2010-250144, mailing date Jan. 14, 2014, with English translation thereof (4 pages).
(Continued)

*Primary Examiner* — Shaq Taha
(74) *Attorney, Agent, or Firm* — Osha Liang LLP (57) ABSTRACT

In order to assure reception of broadcast information by a user terminal handed over to a micro base station by CRE (Cell Range Expansion) and to reduce the number of transmission stopped subframes in a macro base station, the present invention provides a notification method for a user terminal to receive modification notification information for notifying modification in system information from the micro base station, the notification method including: the macro base station notifying the micro base station of a subframe pattern including a protection subframe to protect the modification notification information every a plurality of radio frames; and the micro base station notifying the user terminal of identification information of the protection subframe in the subframe pattern.

15 Claims, 9 Drawing Sheets

(51) Int. Cl.
*H04W 68/00* (2009.01)
*H04W 48/12* (2009.01)
*H04W 36/04* (2009.01)

(56) References Cited

U.S. PATENT DOCUMENTS

| | | | |
|---|---|---|---|
| 2009/0316655 A1* | 12/2009 | Prakash et al. | 370/331 |
| 2010/0135235 A1* | 6/2010 | Ji et al. | 370/329 |
| 2010/0278282 A1* | 11/2010 | Yano et al. | 375/298 |
| 2011/0103288 A1* | 5/2011 | Lee et al. | 370/312 |
| 2011/0171929 A1 | 7/2011 | Tamura et al. | |
| 2011/0188481 A1* | 8/2011 | Damnjanovic et al. | 370/336 |
| 2011/0205952 A1* | 8/2011 | Gou et al. | 370/312 |
| 2011/0211486 A1* | 9/2011 | GoldHammer | 370/252 |
| 2011/0310830 A1* | 12/2011 | Wu et al. | 370/329 |
| 2012/0213161 A1* | 8/2012 | Maeda et al. | 370/328 |

OTHER PUBLICATIONS

Notification of Reasons for Rejection in Japanese Patent Application No. 2010-250144 dated Oct. 15, 2013 (5 pages).
International Search Report issued in PCT/JP2011/075657, mailed Dec. 6, 2011 (4 pages).
3GPP TS 36.300 V8.10.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Sep. 2009 (147 pages).
Fujitsu, "Discussion on Enhanced ICIC Schemes for Control Channel in HetNet," 3GPP TSG RAN WG1 Meeting #61bis; R1-104049; Dresden, Germany; Jun. 28-Jul. 2, 2010 (4 pages).
NTT DoCoMo, "Views on eICIC Schemes for Rel-10," 3GPP TSG RAN WG1 Meeting #62bis; R1-105724; Xian, China; Oct. 11-15, 2010 (9 pages).

* cited by examiner

NOTIFICATION METHOD, USER TERMINAL AND RADIO BASE STATION

TECHNICAL FIELD

The present invention relates to a notification method, a user terminal and a radio base station in a radio communication system where a micro cell is provided in a macro cell.

BACKGROUND ART

There has been defined in the standards organization 3GPP a radio communication system employing an LTE (Long Term Evolution) scheme (hereinafter referred to as "LTE system") as a successor system to the UMTS (Universal Mobile Telecommunications System). Now in 3GPP, a radio communication system employing an LTE-Advanced scheme (hereinafter referred to as "LTE-A system") has been under study as a successor system to the LTE system.

In the LTE-A system, there has been studied HetNet (Heterogeneous Network) in which a micro cell (for example, pico cell or femto cell) having a local coverage of about several-ten-meter radius is formed in a macro cell having a wide coverage of several-kilometer radius (for example, see Non Patent Literature 1).

In such HetNet, for the purpose of improving throughput of the whole system, it has been studied to perform CRE (Cell Range Expansion). In CRE, the range of the micro cell is expanded by adding an offset to reception power from a radio base station that forms the micro cell (hereinafter referred to as "micro base station"). Therefore, a user terminal positioned inside the expanded micro cell can be handed over from a radio base station that forms the macro cell (hereinafter referred to as "macro base station") to the micro base station.

Also, in such HetNet, the user terminal handed over to the micro base station by CRE suffers from heavy interference from the macro base station. Therefore, interference coordination has been under study to stop data transmission by the macro base station in some subframes thereby to reduce interference that the user terminal suffers from by the macro base station.

Figure 1:
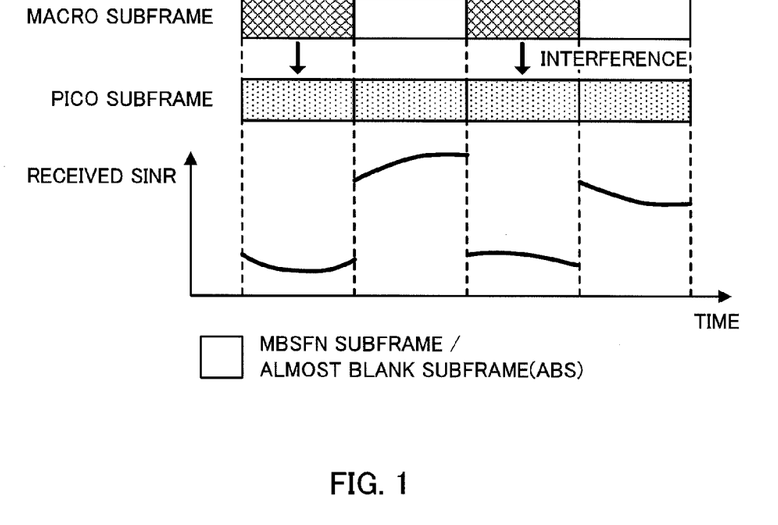
FIG. 1 is a diagram illustrating an example of interference coordination.

FIG. 1 is a diagram illustrating an example of interference coordination. As illustrated in FIG. 1, in subframes in which the macro base station performs data transmission (first and third subframes from the left), reception power of the user terminal from the micro base station is lowered because it suffers from interference from the macro base station. On the other hand, in subframes where the macro base station stops data transmission (second and fourth subframes from the left), reception power of the user terminal from the micro base station is increased because it does not suffer from interference from the macro base station. Here, in subframes where the data transmission is stopped (hereinafter referred to as "transmission stopped subframes), data transmission may not be stopped completely or a small amount of data may be transmitted as far as interference to the user terminal falls within acceptable limits. As a transmission stopped subframe, for example, a MBSFN (MBMS (Multimedia Broadcast and Multicast Service) over a Single Frequency Network) subframe or an ABS (Almost Blank Subframe) may be used.

CITATION LIST

Non Patent Literature

Non Patent Literature 1: 3GPP, TS36.300

SUMMARY OF INVENTION

Technical Problem

In a radio communication system performing interference coordination as described above, the macro base station stops data transmission in subframes where broadcast information (for example, MIB, SIB1 or paging) is transmitted from the micro base station so that the user terminal handed over to the micro base station by CRE can be assured to receive the broadcast information. On the other hand, in order for the user terminal to be able to receive the broadcast information, there arises a problem of increasing the number of transmission stopped subframes in the macro base station.

The present inventor was carried out in view of the foregoing and aims to provide a notification method, a user terminal and a radio base station capable of reducing the number of transmission stopped subframes in the macro base station while assuring reception of the broadcast information by the user terminal handed over to the micro base station by CRE.

Solution to Problem

A first aspect of the present invention is a notification method by which a user terminal receives modification notification information for notifying modification in system information from a micro base station that is arranged in a macro cell formed by a macro base station and forms a smaller micro cell than the macro cell, the notification method comprising the steps of: at the macro base station, notifying the micro base station of a subframe pattern including a protection subframe to protect the modification notification information every a plurality of radio frames; and the micro base station notifying the user terminal of identification information of the protection subframe in the subframe pattern.

A second aspect of the present invention is a user terminal that receives modification notification information for notifying modification in system information from a micro base station that is arranged in a macro cell formed by a macro base station and forms a smaller micro cell than the macro cell, the user terminal comprising a receiving section configured to receive identification information of a protection subframe in a subframe pattern notified from the macro base station to the micro base station, the protection subframe being for protecting the modification notification information every a plurality of radio frames and to receive broadcast information in the protection subframe.

A third aspect of the present invention is a radio base station that is arranged in a macro cell formed by a macro base station and forms a micro cell which is smaller than the macro cell, comprising: a receiving section configured to receive, from the macro base station, a subframe pattern including a protection subframe to protect modification notification information for communicating modification in system information every a plurality of radio frames; and a notifying section configured to notify a user terminal of identification information of the protection subframe in the subframe pattern.

A fourth aspect of the present invention is a radio base station that forms a macro cell and is connected to a micro base station forming a micro cell that is smaller than the macro cell, comprising: a notifying section configured to notify the micro base station of a subframe pattern including a protection subframe to protect modification notification information for notifying modification in system information every a plurality of radio frames.

Advantageous Effects of Invention

According to the present invention, it is possible to provide a notification method, a user terminal and a radio base station capable of reducing the number of transmission stopped subframes in a macro base station while assuring reception of broadcast information by a user terminal handed over to a micro base station by CRE.

DESCRIPTION OF EMBODIMENTS

The following description will be made by way of example where a pico cell is used as a micro cell, however, this is by no means limiting and for example, the micro cell may be a femto cell or a cell formed by a relay node. And, the ABS is taken as an example of a transmission stopped subframe, and this is by no means limiting and for example, it may be a MBSFN subframe.

Figure 2:
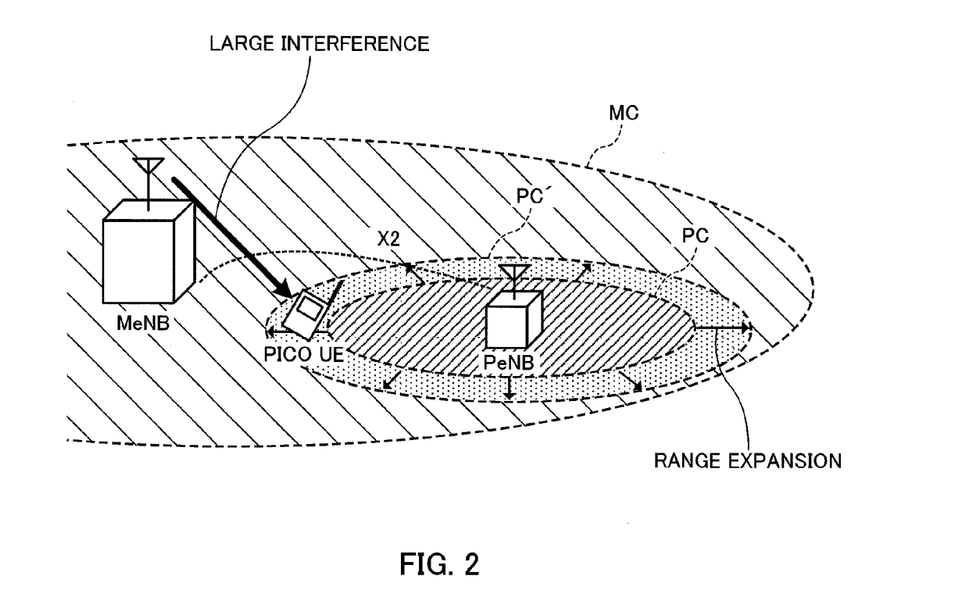
FIG. 2 is a diagram schematically illustrating the configuration of a radio communication system to which a notification method according to the present invention is applied.

FIG. 2 is a schematic diagram illustrating the configuration of a radio communication system according to the present invention. As illustrated in FIG. 2, the radio communication system according to the present invention includes a radio base station that forms a macro cell (hereinafter referred to as "macro base station") MeNB (Macro evolved NodeB), a radio base station that forms a pico cell PC (hereinafter referred to as "pico base station") PeNB (Pico evolved NodeB) and a user terminal UE (User Equipment).

As illustrated in FIG. 2, the macro base station MeNB and the pico base station PeNB are connected to each other via a wired X2 interface. And, the macro base station MeNB and the pico base station PeNB are both connected to a core network (not shown). Further, the macro base station MeNB and the pico base station PeNB share at least a part of a radio frequency band.

In the radio communication system illustrated in FIG. 2, when the user terminal UE is located inside the pico cell PC, the reception power from the pico base station PeNB becomes greater than the reception power from the macro base station MeNB, and therefore, the user terminal is connected to the pico base station PeNB. On the other hand, when the user terminal UE is located outside the pico cell PC, the reception power from the pico base station PeNB becomes smaller than the reception power from the macro base station MeNB, and therefore, the user terminal UE is connected to the macro base station MeNB.

Further, in the radio communication system illustrated in FIG. 2, CRE (Cell Range Expansion) is performed. In CRE, an offset is added to the reception power from the pico base station PeNB. Therefore, when the user terminal UE is located outside the pico cell PC but inside an expanded pico cell PC', the reception power (added with the offset) from the pico base station PeNB becomes greater than the reception power from the macro base station MeNB. Therefore, when the user terminal UE is located even outside the pico cell PC but inside the expanded pico cell PC', the user terminal UE can be connected to the pico base station PeNB and it can be handed over from the macro base station MeNB to the pico base station PeNB. In the following description, the user terminal UE connected to the pico base station PeNB is called pico terminal UE and the user terminal UE connected to the macro base station MeNB is called macro terminal UE, but they have the same configurations.

Further, in the radio communication system illustrated in FIG. 2, the pico terminal UE handed over to the pico base station PeNB by CRE suffers from heavy interference from the macro base station MeNB as illustrated in FIG. 2. Therefore, the macro base station MeNB sets ABS to subframes for broadcasting broadcast information from the pico base station so that the pica terminal UE is assured to receive the broadcast information.

Figure 3:
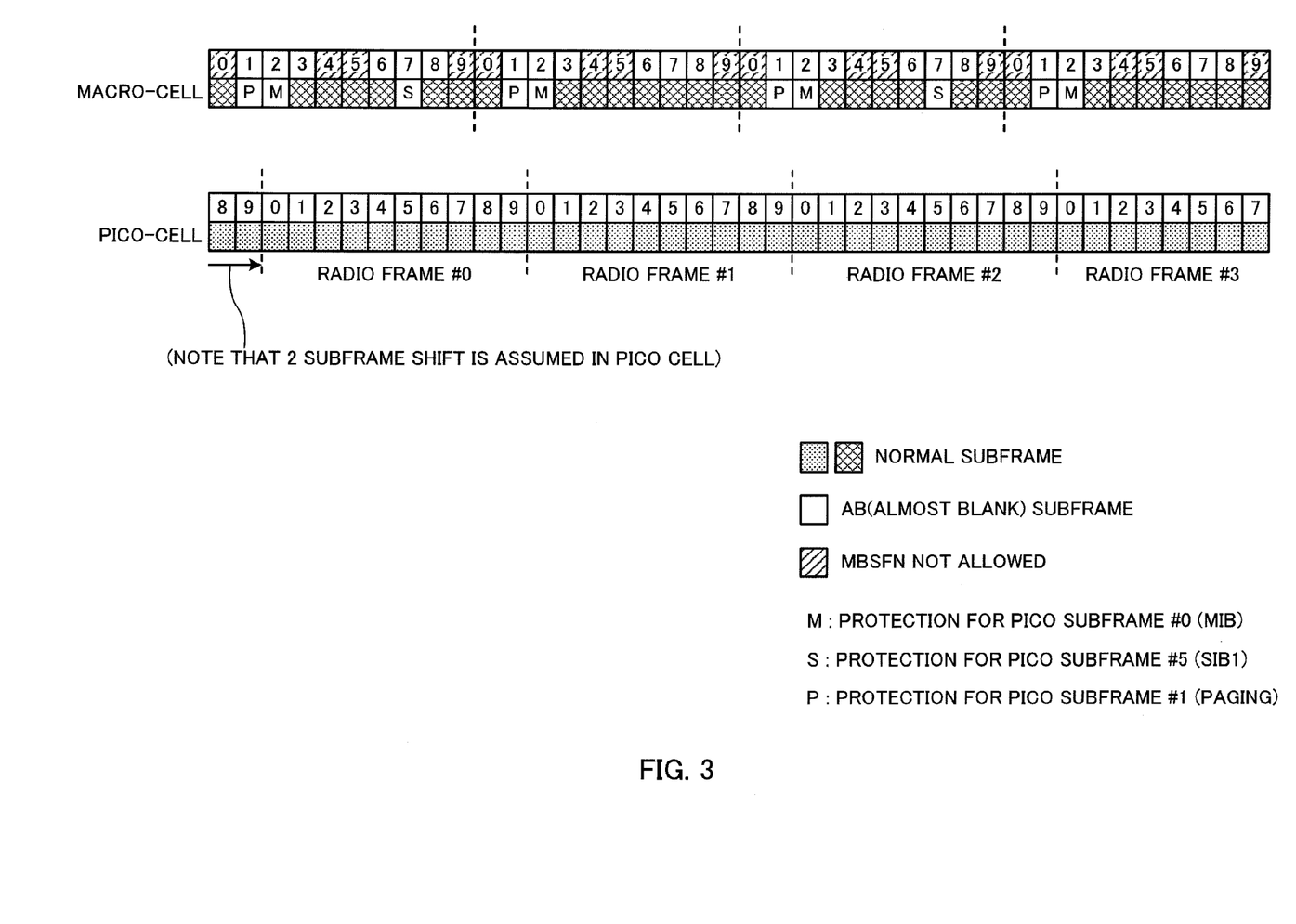
FIG. 3 is a diagram illustrating an example of an ABS pattern.

FIG. 3 is a diagram illustrating an example of an ABS pattern. The ABS pattern is a pattern indicating ABSs in one or more radio frames of the macro base station MeNB. The ABS pattern illustrated in FIG. 3 has a period of 4 radio frames (=40 subframes=40 milliseconds). And, in FIG. 3, MIB (Master Information Block), SIB (System Information Block) 1, paging and the like are broadcasted as the broadcast information.

As illustrated in FIG. 3, the MIB from the pico base station PeNB is transmitted at intervals of 10 subframes (milliseconds) and in the subframe #0 of each of the radio frames #0 to #3. And, the SIB1 from the pico base station PeNB is transmitted at intervals of 20 subframes and in the subframe #5 of each of the even-numbered radio frames #0 and #2. Further, the paging from the pico base station PeNB is transmitted at intervals of 10 subframes and in either of the subframes #0,#4, #5 and #9 (subframe numbers in the pico cell in FIG. 3) (In FIG. 3, subframe #9) of each of the radio frames #0 to #3.

Here, in the ABS pattern illustrated in FIG. 3, ABS is set to each of subframes corresponding to the subframes where MIB, SIB1 or paging is transmitted from the pico base station PeNB (that is, subframes #0 and #9 of the radio frames #0 to #3 and subframes #5 of the radio frames #0 and #2).

As described above, in the ABS pattern illustrated in FIG. 3, the ABS is set at intervals of 10 subframes at the macro base station MeNB for protecting the MIB or paging broadcasted from the pico base station PeNB. However, in the uplink of the macro base station MeNB, the HARQ (Hybrid Automatic Repeat Request) process is performed at intervals of 8 subframes. Therefore, ABS is sometimes set to a subframe for transmitting ACK/NACK of uplink data in the downlink by the macro base station MeNB. Then, the macro base station MeNB cannot transmit ACK/NACK of the uplink data in the ABS, which prevents smooth retransmission control of the uplink data. In this way, when the ABS is increased in number in the macro base station MeNB, there may arise a problem for communication between the macro base station MeNB and the macro terminal UE.

Here, when there is a modification in system information in the radio communication system illustrated in FIG. 2, the pico base station PeNB notifies the modification in the system information in a "modification period". Note that the "modification period" means a predetermined period prior to modification in the system information. More specifically, the pico base station PeNB broadcasts modification notification information of the system information at predetermined intervals in the modification period. The modification notification information may be included in the paging or SIB1.

For example, when the modification period is 5.12 seconds and the modification notification information is broadcasted at intervals of 10 subframes, the modification notification information is broadcasted 500 times. The pico terminal UE receives the modification notification information a predetermined number of times (for example, 4 times) in the "modification period" thereby to detect the modification in the system information. That is, the pico terminal UE does not need to receive all of the modification notification information broadcasted at predetermined intervals, and there is no need to protect all of the modification notification information.

Then, the present inventors have noted that it is not necessary to protect all of the modification notification information out of the broadcast information broadcasted at predetermined intervals from the pico base station PeNB, and finally completed the present invention.

In the notification method according to the present invention, the macro base station MeNB notifies the pico base station PeNB of an ABS pattern (subframe pattern) including a protection subframe to protect modification notification information broadcasted from the pico base station PeNB (micro base station), in every a plurality of radio frames. And, the pico base station PeNB notifies the pico terminal UE (user terminal) of identification information of the protection subframe in the ABS pattern.

According to the notification method according to the present invention, the pico terminal UE is able to specify which modification notification information is protected out of the modification notification information broadcasted periodically from the pico base station PeNB by the identification information from the pico base station PeNB. Accordingly, even if the ABSs to protect the modification notification information are reduced in the macro base station MeNB, the pico terminal UE can receive the modification notification information.

Figure 4:
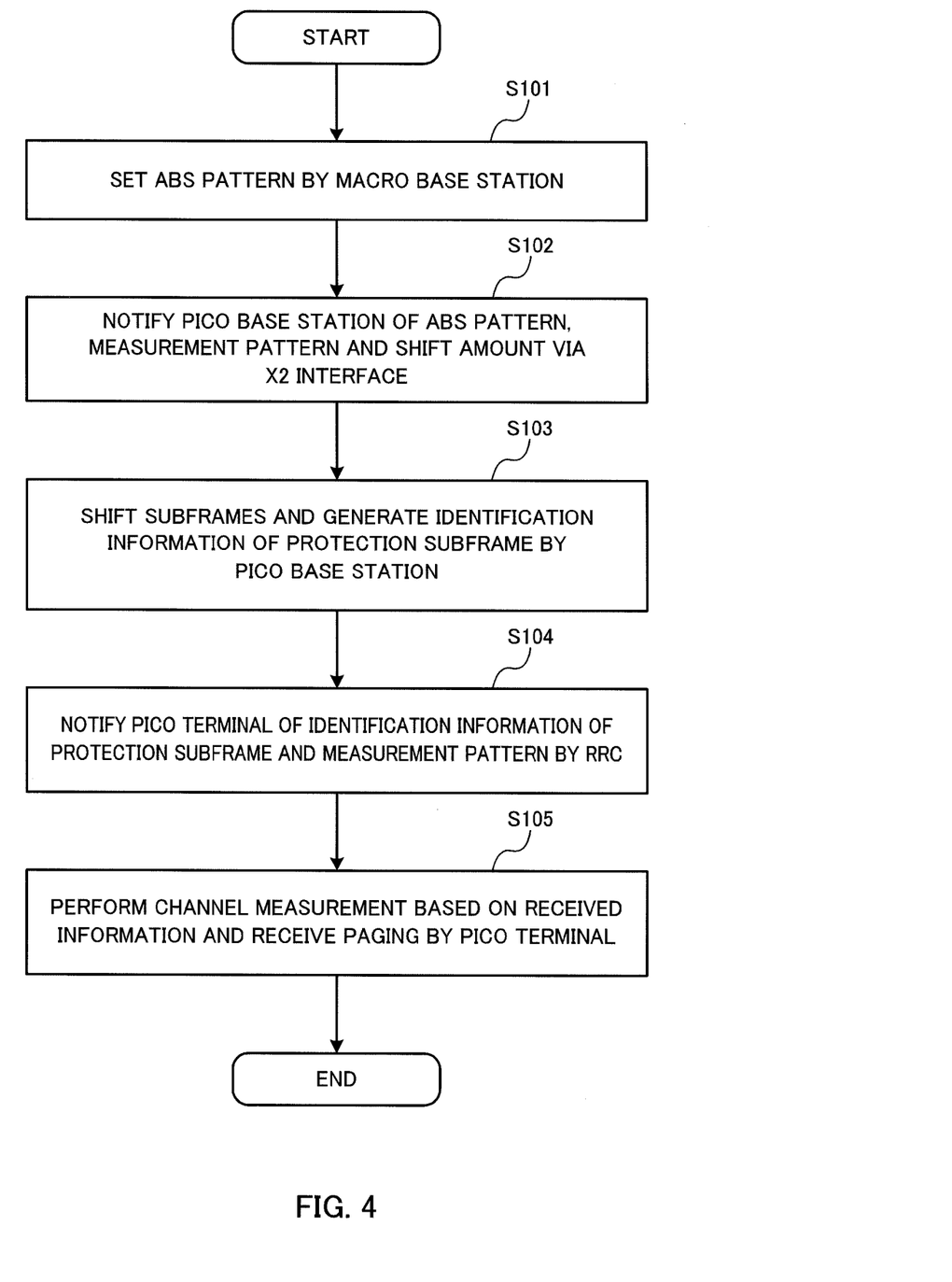
FIG. 4 is a flowchart for explaining the notification method according to the present invention.

Next description is made about the notification method according to the present invention. FIG. 4 is a flowchart for explaining the notification method according to the present invention. Here, in FIG. 4, it is assumed that the modification notification information of the system information is included in the paging.

As illustrated in FIG. 4, in the notification method according to the present invention, the macro base station MeNB sets the ABS pattern (step S101). The ABS pattern is a pattern indicating ABSs in one or more radio frames of the macro base station MeNB.

Figure 5:
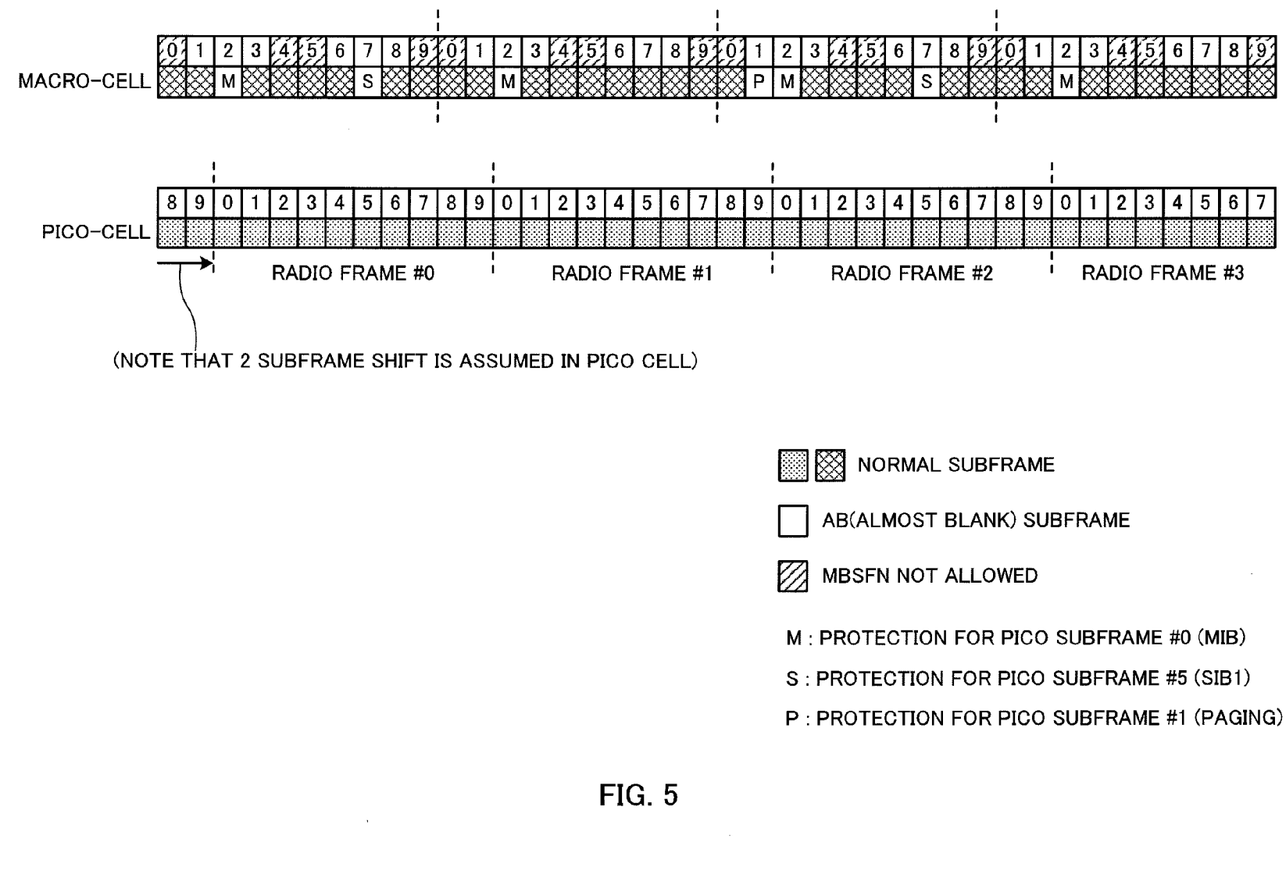
FIG. 5 is a diagram illustrating an example of an ABS pattern according to the present invention.

FIG. 5 is a diagram illustrating an example of the ABS pattern set in the notification method according to the present invention. The ABS pattern illustrated in FIG. 5 has a period of 4 radio frames (=40 subframes=40 milliseconds), but this is by no means for limiting the present invention. And, in FIG. 5, it is assumed that the modification notification information of the system information is included in the paging.

In the ABS pattern illustrated in FIG. 5, all the subframes in which the MIB or SIB1 is transmitted from the pico base station PeNB (that is, subframes #0 of the radio frames #0 to #3 and subframes #5 of the radio frames #0 and #2) are under protection. On the other hand, unlike in FIG. 3, one out of the subframes in which the paging is transmitted from the pico base station PeNB becomes under protection. That is, this ABS pattern includes a protection subframe to protect the paging broadcasted in one out of the radio frames #0 to #3.

This ABS pattern is expressed in bit map including bits that are equal in number to the subframes included in the ABS pattern. For example, the ABS pattern illustrated in FIG. 5 is represented in bit map of 40 bits "0010000100 0010000000 0110000100 0010000000". In this bit map, in FIG. 5, the subframe to which the ABS is set is represented by "1".

And, in this notification method according to the present invention, as illustrated in FIG. 4, the macro base station MeNB notifies the pico base station PeNB of the above-mentioned ABS pattern, a measurement pattern (described later) in the pico terminal UE and a shift amount in the pico base station PeNB with use of the X2 interface (step S102).

Note that the shift amount in the pico base station PeNB is a shift amount to match the above-described protection subframe to a subframe to broadcast the modification notification information from the pico base station PeNB. For example, in FIG. 5, in order to match the protection subframe from the macro base station MeNB (that is the subframe #1 of the third radio frame from the left) to the subframe #9 to broadcast paging from the pico base station PeNB, it is necessary to perform 2-subframe shift in the pico base station PeNB. Accordingly, in FIG. 5, the macro base station MeNB notifies the pico base station PeNB of the shift amount of 2 subframes. With this notification, it is possible to make highly accurate protection of the paging (modification notification information) and other broadcast information (MIB, SIB1 and so on) as compared with the case of setting a shift amount on an autonomous basis by the pico base station PeNB.

Figure 6:
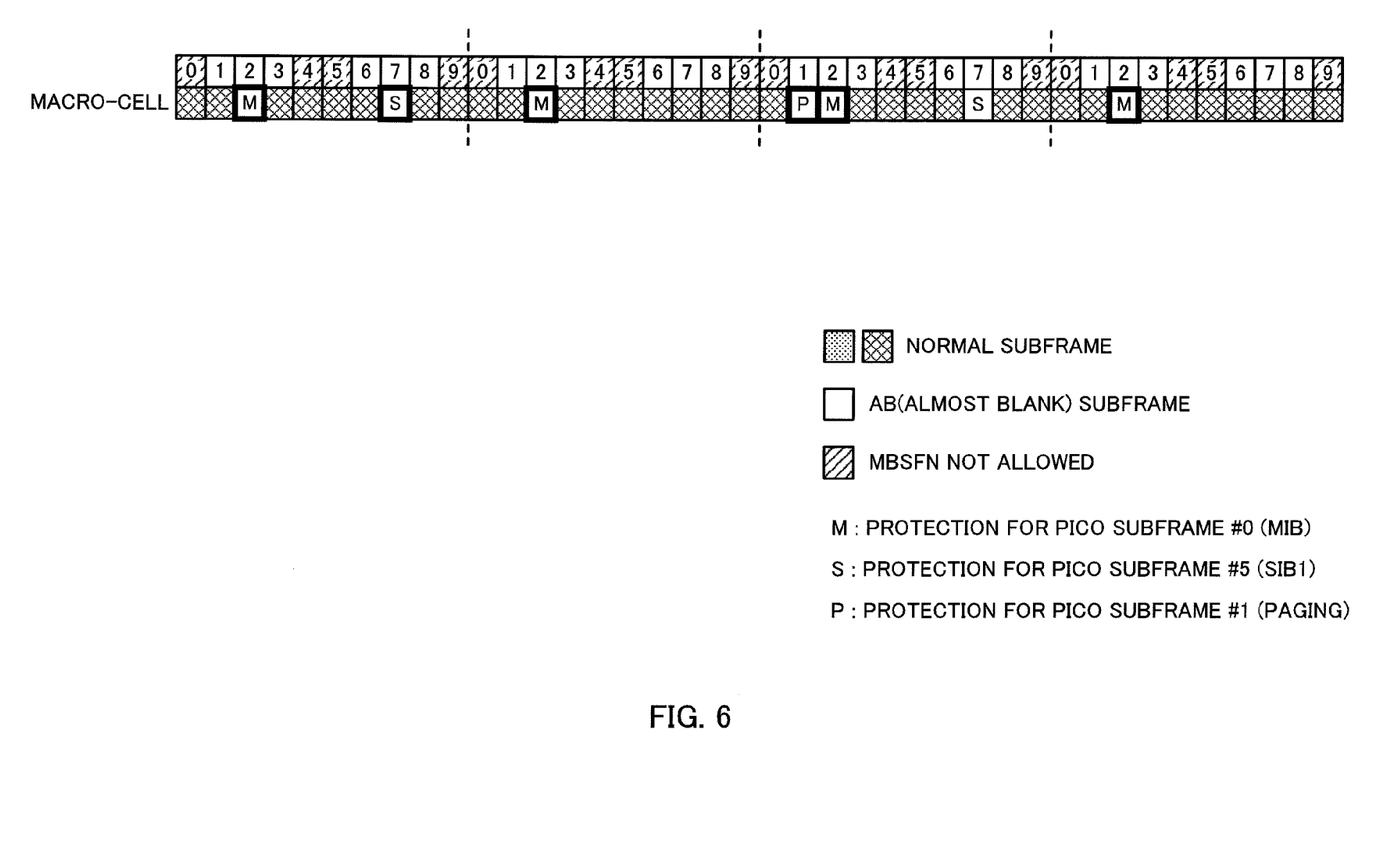
FIG. 6 is a diagram illustrating an example of a measurement pattern according to the present invention.

And, the measurement pattern is a pattern for identifying a subframe to measure channel quality in the pico terminal UE. The measurement pattern is set as a subset of the above-mentioned ABS pattern. FIG. 6 is a diagram illustrating an example of the measurement pattern which is set in the notification method according to the present invention.

As illustrated in FIG. 6, in the measurement pattern, a particular ABS in the ABS pattern is designated as a subframe to measure the channel quality. In FIG. 6, the first to fifth and seventh ABSs from the left are designated as measurement subframes. The designated ABSs are set fixedly so that the pico terminal UE can measure the channel quality without suffering from interference from the macro base station MeNB. Note that the sixth ABS from the left is set dynamically and is not suitable as the measurement subframe.

And, the measurement pattern is represented in bit map formed with bits that are equal in number to the subframes contained in the measurement pattern. For example, the ABS pattern illustrated in FIG. 6 is represented in bit map of 40 bits "0010000100 0010000000 0110000000 0010000000". In this bit map, in FIG. 6, the ABS designated as the measurement subframe is represented by "1".

Further, in the notification method according to the present invention, as illustrated in FIG. 4, the pico base station PeNB shifts the subframes based on the shift amount notified from the macro base station MeNB thereby to generate identification information of the protection subframe (step S103).

Specifically, the pico base station PeNB shifts the subframes by the shift amount notified from the macro base station MeNB thereby to match the protection subframe to the subframe to broadcast the modification notification information. For example, in FIG. 5, the pico base station PeNB shifts the subframes by two in accordance with the shift amount notified from the macro base station MeNB. With this shift, the subframe #9 to broadcast paging in the pico base station PeNB is matched to the protection subframe.

The pico base station PeNB generates identification information of the protection subframe in the ABS pattern based on the ABS pattern notified from the macro base station MeNB. The identification information may be bit map formed with a predetermined number of bits or may be associated with the position of the measurement subframe in the measurement pattern.

Specifically, the identification information may be represented in bit map formed with bits that are equal in number to the subframes contained in the ABS pattern. For example, in FIG. 5, the identification information is represented in bit map formed with 40 bits of "0000000000 0000000000 0100000000 0000000000".

And, the identification information may be represented in bit map formed with bits that are equal in number to subframes contained in one radio frame. For example, in FIG. 5, the identification information is presented by the bit map formed with 10 bits of "0100000000" and the position of the radio frame including the protection subframe (here, the third radio frame from the left).

Further, the identification information may be associated with the position of a measurement subframe in the measurement pattern. For example, in FIG. 6, the protection subframe to protect the paging (modification notification information) is matched to the fourth measurement subframe from the left. Therefore, the identification information of the protection subframe is "the fourth subframe". As described later, the pico base station PeNB notifies the pico terminal UE of the measurement pattern. Accordingly, it is possible to reduce the amount of signaling to the pico terminal UE by associating the identification information with the position of the measurement subframe. In such a case, the identification information may be notified in advance or may be notified together with the measurement pattern.

Further, in the notification method according to the present invention, as illustrated in FIG. 4, the pico base station PeNB notifies the pico terminal UE of the identification information of the protection subframe and the measurement pattern (step S104). Specifically, the pico base station PeNB uses an RRC (Radio Resource Control) signal to transmit the identification information of the protection subframe and the measurement pattern.

The pico terminal UE receives paging (modification notification information) from the pico base station PeNB in the protection subframe based on the notified identification information. And, the pico terminal UE measures channel quality in the measurement subframe based on the notified measurement pattern (step S105).

Up to this point, the notification method according to the present invention has been described. However, the notification method according to the present invention is not limited to this and may be embodied in various modified forms. For example, in the above-described notification method, the identification information of the protection subframe is generated in the pico base station PeNB (step S103), however, it may be generated in the macro base station MeNB and may be notified to the pico base station PeNB. Further, in the above-described notification method, the shift amount in the pico base station PeNB is notified from the macro base station MeNB (step S102), however, it may be determined in the pico base station on an autonomous basis.

Figure 7:
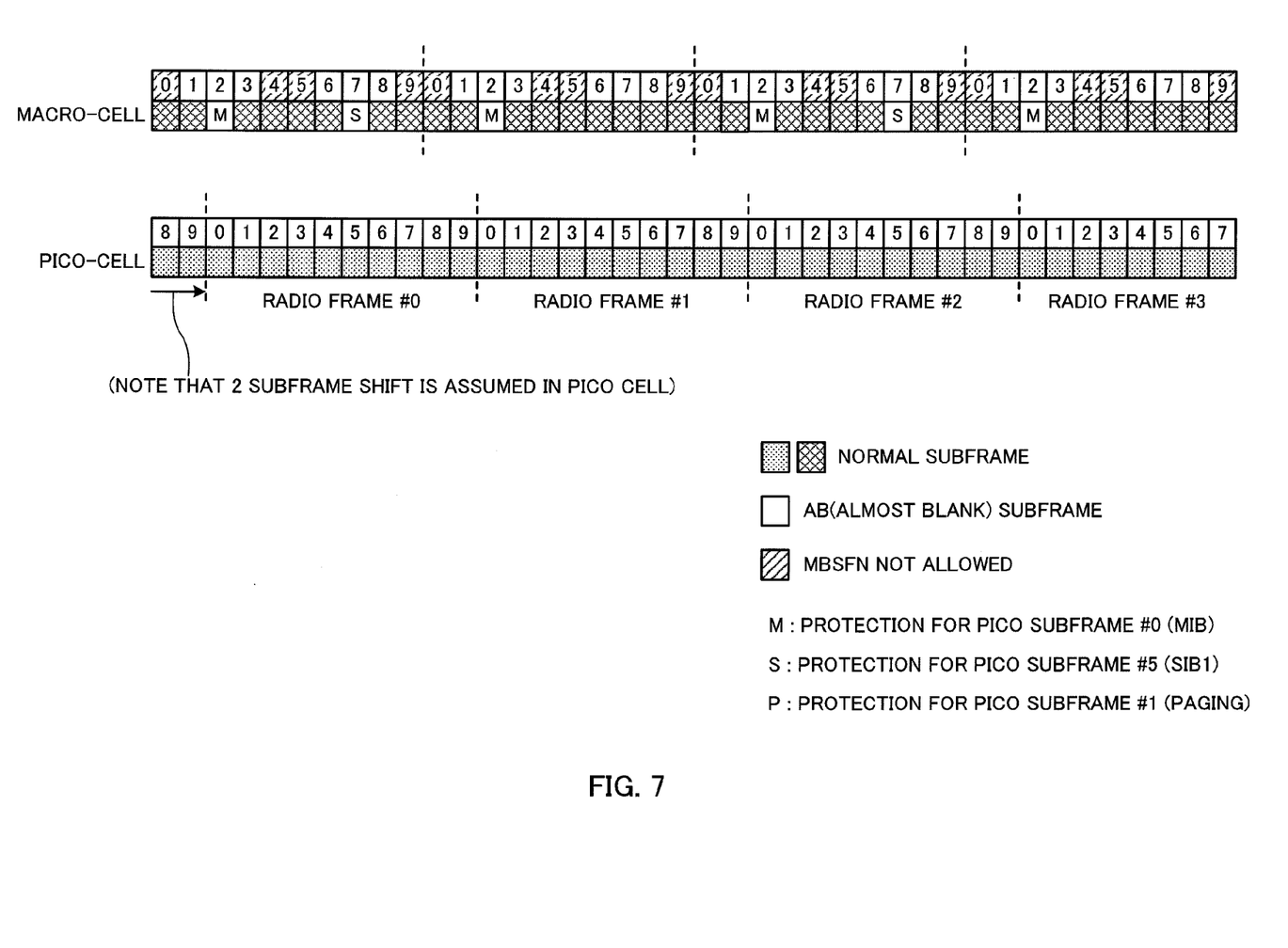
FIG. 7 is a diagram illustrating another example of the ABS pattern according to the present invention.

Further, in the above-described notification method, the modification notification information of the system information is included in paging but may be included in SIB1. In such a case, the ABS pattern may include a protection subframe to protect the SIB1. In other words, the subframe to transmit the SIB1 from the pico base station PeNB may be set to the ABS and there is no need to set the ABS in a subframe to transmit paging from the pico base station PeNB. In this case, as illustrated in FIG. 7, in this ABS pattern, the SIB1 is transmitted in each of the radio frames #0 and #2. That is, one SIB1 is transmitted for the two radio frames #0 and #1 and one SIB1 is transmitted for the two radio frames #2 and #3. In this way, the ABS pattern illustrated in FIG. 7 includes one protection subframe in every a plurality of radio frames. As illustrated in FIG. 7, in this ABS pattern, only 6 ABSs may be set and the number of ABSs can be reduced as compared with the ABSs in the ABS pattern illustrated in FIG. 5. And, in such a case, in CRE, the pico base station PeNB notifies the pico terminal UE that the above-mentioned modification notification information should be obtained with reference to the SIB1 instead of paging.

Next description is made in detail about an embodiment of the present invention, with reference to the accompanying drawings.

The schematic structure of a radio communication system according to the embodiment of the present invention is the same as that illustrated in FIG. 2. Each apparatus illustrated in FIG. 2 (that is, a macro base station MeNB, a pico base station PeNB and a pico terminal UE) has hardware such as an antenna, a communication interface, a processor, a memory and a transmission/reception circuit and the memory stores software modules to be executed by the processor. And, the functional structure of each apparatus described later may be realized by the above-described hardware, by software modules executed by the processor, or may be realized in their combination.

Figure 8:
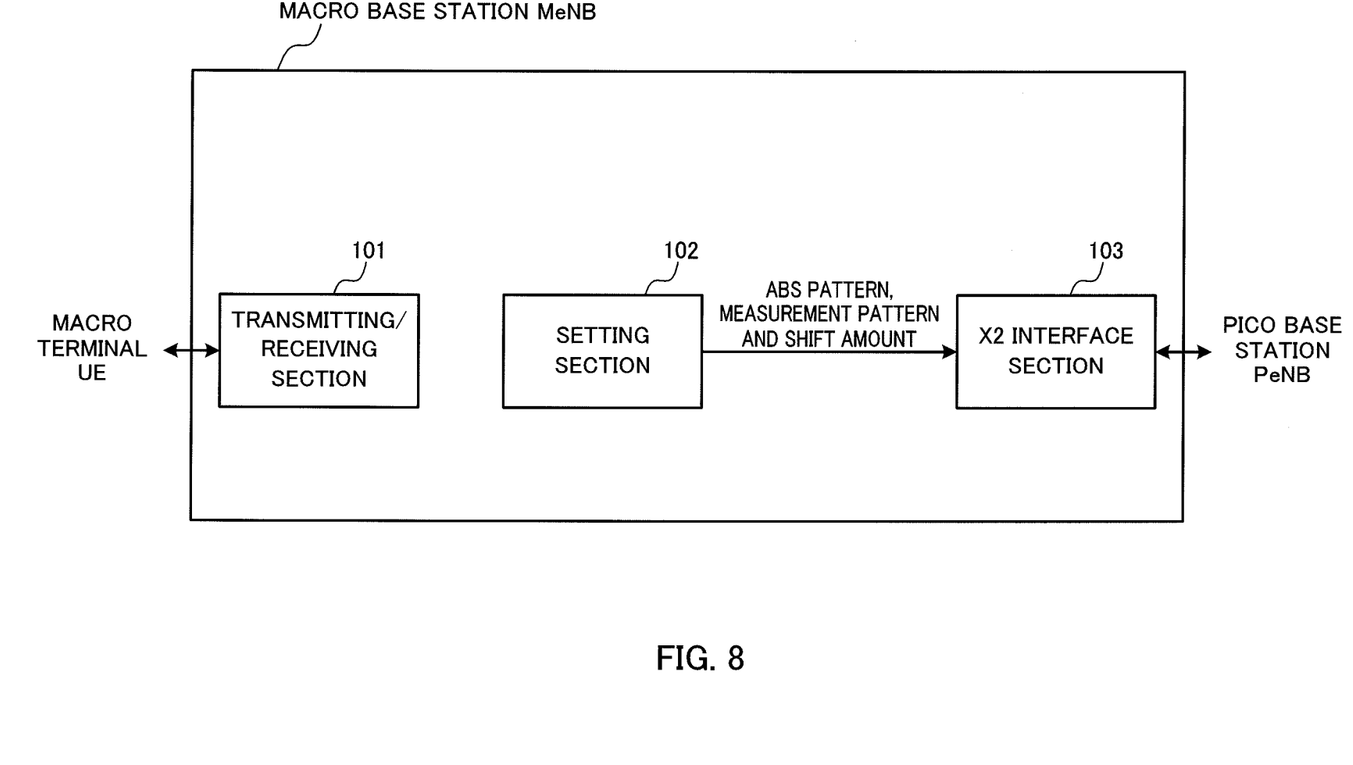
FIG. 8 is a functional diagram of a macro base station according to an embodiment of the present invention.

FIG. 8 is a diagram illustrating the functional structure of the macro base station according to the embodiment of the present invention. As illustrated in FIG. 8, the macro base station MeNB has a transmitting/receiving section 101, a setting section 102 and an X2 interface section 103 (notifying section).

The transmitting/receiving section 101 performs transmission and reception of radio signals with the macro terminal UE.

The setting section 102 sets an ABS pattern including a protection subframe to protect modification notification information and outputs the ABS pattern to the X2 interface section 103. As described above, the modification notification information is information which is broadcasted periodically from the pico base station PeNB to notify modification in system information. The modification notification information may be included in paging or SIB1.

More specifically, when the modification notification information is included in the paging, as illustrated in FIG. 5, the setting section 102 sets the ABS pattern including a protection subframe to protect paging every a plurality of radio frames. Note that when the modification notification information is included in an SIB1, the setting section 102 may set an ABS pattern including a protection subframe to protect the SIB1 as illustrated in FIG. 7.

Further, the setting section 102 sets a measurement pattern as a subset of the ABS pattern and outputs it to the X2 interface section 103. The measurement pattern is, as illustrated in FIG. 6, a pattern indicating a measurement subframe to measure the channel quality in the pico terminal UE.

Further, the setting section 102 sets the shift amount in the pico base station PeNB. And, the setting section 102 outputs the set shift amount to the X2 interface section 103. More specifically, the setting section 102 sets the shift amount in the pico base station PeNB so that the broadcast information and the like can be protected in the pico cell in accordance with the set ABS pattern.

The X2 interface section 103 performs transmission and reception of signals with the pico base station PeNB via the X2 interface. More specifically, the X2 interface section 103 transmits the ABS pattern, the measurement pattern and the shift amount, having been received as input from the setting section 102, to the pico base station PeNB.

Figure 9:
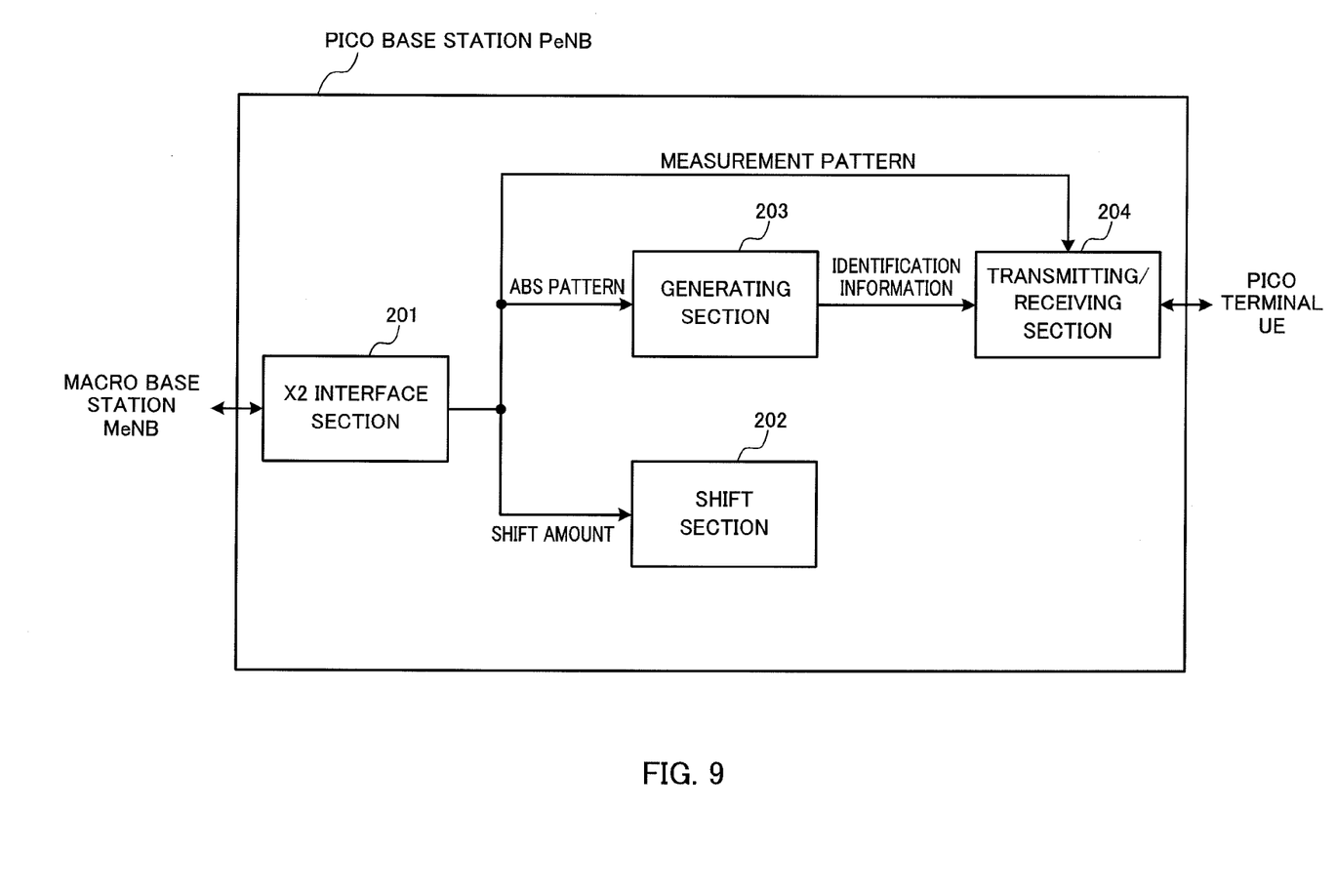
FIG. 9 is a functional diagram of a pico base station according to the embodiment of the present invention.

FIG. 9 is a diagram illustrating the functional structure of the pico base station according to the embodiment of the present invention. As illustrated in FIG. 9, the pico base station PeNB includes an X2 interface section 201 (receiving section), a shift section 202, a generating section 203 and a transmitting/receiving section 204 (notifying section).

The X2 interface section 201 performs transmission and reception of signals with the macro base station MeNB via the X2 interface. More specifically, the X2 interface section 201 receives the ABS pattern, the measurement pattern and the shift amount from the macro base station MeNB.

The shift section 202 shifts the subframes based on the shift amount received as input from the X2 interface section 201. More specifically, the shift section 202 shifts the subframes by the shift amount notified from the macro base station MeNB so as to match the protection subframe to the subframe to broadcast the modification notification information.

The generating section 203 generates identification information of the protection subframe based on the ABS pattern received as input from the X2 interface section 201 and outputs it to the transmitting/receiving section 204. As described above, the identification information may be a bit map composed of a predetermined number of bits or may be associated with the position of a measurement subframe in the measurement pattern. Note that, though it is not shown, the generating section 203 may generate the identification information of the protection subframe based on the measurement pattern received as input from the X2 interface section 201.

The transmitting/receiving section 204 performs transmission and reception of radio signals with the pico terminal UE. More specifically, the transmitting/receiving section 204 transmits, to the pico terminal UE, the identification information received as input from the generating section 203 and the measurement pattern received as input from the X2 interface section 201.

Figure 10:
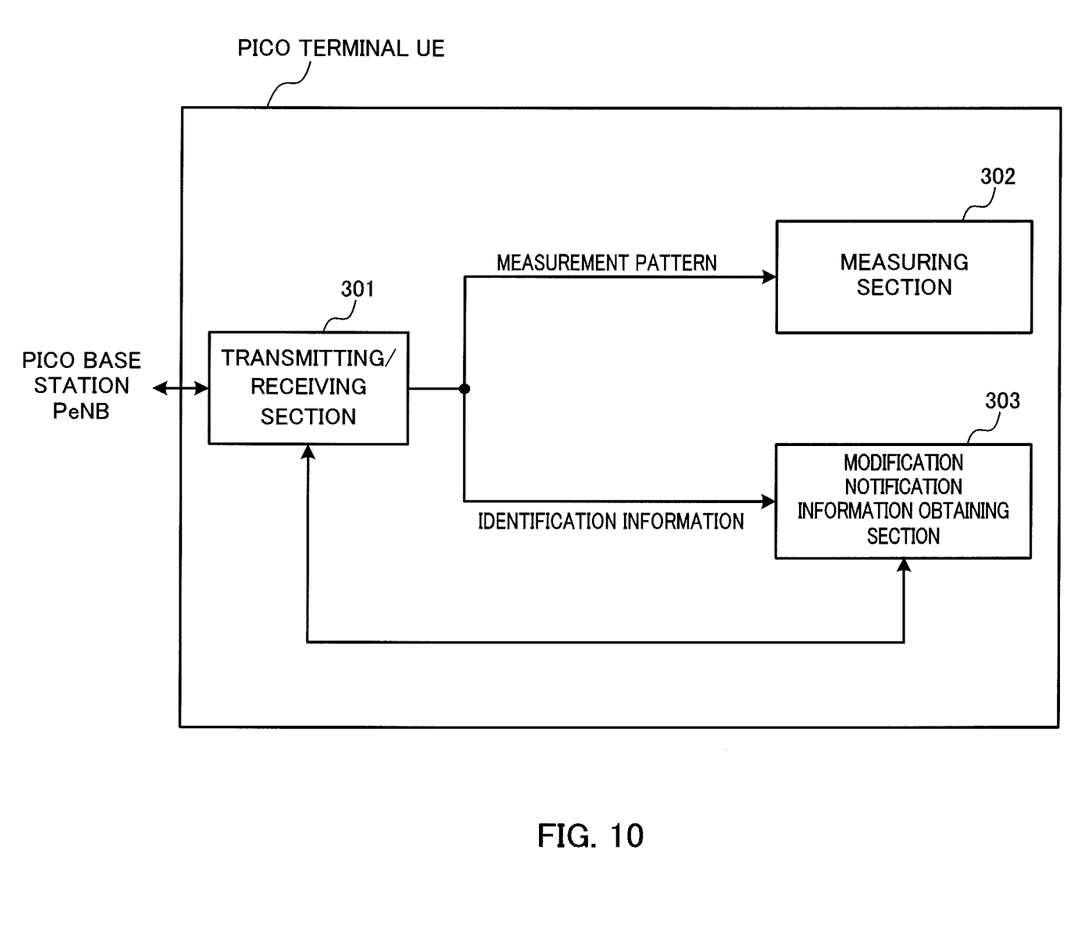
FIG. 10 is a functional diagram of a user terminal according to the embodiment of the present invention.

FIG. 10 is a diagram illustrating the functional structure of the pico terminal according to the embodiment of the present invention. As illustrated in FIG. 10, the pico terminal UE has a transmitting/receiving section 301 (receiving section), a measuring section 302 and a modification notification information obtaining section 303.

The transmitting/receiving section 301 performs transmission and reception of radio signals with the pico base station PeNB. More specifically, the transmitting/receiving section 301 receives the identification information of the protection subframe and the measurement pattern transmitted from the pico base station PeNB. And, the transmitting/receiving section 301 receives the broadcast information (for example, MIB, SIB1, paging, PSS/SSS and so on) broadcasted at predetermined intervals from the pico base station PeNB. And, the transmitting/receiving section 301 receives modification notification information in the protection subframe designated by the modification notification information obtaining section 303 described later.

The measuring section 302 measures the channel quality based on the measurement pattern received as input from the transmitting/receiving section 301. More specifically, the measuring section 302 measures channel quality in the measurement subframe designated by the measurement pattern.

The modification notification information obtaining section 303 obtains modification notification information based on identification information received as input from the transmitting/receiving section 301. More specifically, the modification notification information obtaining section 303 specifies the protection subframe of the modification notification information based on the identification information. And, the modification notification information obtaining section 303 instructs the transmitting/receiving section 301 to receive the modification notification information in the specified protection subframe. The modification notification information obtaining section 303 obtains the modification notification information received in the protection subframe, from the transmitting/receiving section 301.

In the thus-structured radio communication system, first, the macro base station MeNB notifies the pico base station PeNB of the subframe pattern including a protection subframe to protect modification notification information every a plurality of radio frames.

In this case, when the modification notification information is included in the paging, used is the subframe pattern including a protection subframe to protect paging broadcasted from the micro base station, as illustrated in FIG. 5. And, when the modification notification information is contained in the SIB1, used is the subframe pattern including a protection subframe to protect SIB1 transmitted every a plurality of radio frames. In the latter case, the pico base station PeNB notifies the pico terminal UE that the modification notification information should be obtained with reference to the SIBs in CRE.

Further, in the macro base station MeNB notifies the pico base station PeNB of the shift amount to match the protection subframe to the subframe to transmit the modification notification information from the pico base station PeNB.

Next, the pico base station PeNB notifies the pico terminal of the identification information of the protection subframe in the subframe pattern.

In this way, in the radio communication system according to the present embodiment, the pico terminal UE is able to specify which modification notification information is protected out of modification notification information broadcasted periodically from the pico base station PeNB, by using the identification information from the pico base station PeNB. Accordingly, even when ABSs to protect modification notification information are reduced in the macro base station MeNB, the pico terminal UE is able to receive the modification notification information. Accordingly, it is possible to reduce ABSs to protect modification notification information out of broadcast information broadcasted periodically from the pico base station MeNB. Consequently, it is possible to reduce the number of ABSs in the macro base station MeNB while assuring reception of the broadcast information by the pico terminal UE.

Further, in the radio communication system according to the present embodiment, the macro base station MeNB notifies the pico base station PeNB of the shift amount of subframes. With this structure, it is possible to protect broadcast information including modification notification information with high accuracy as compared with the case of setting the shift amount on an autonomous basis by the pico base station PeNB.

The present invention has been described in detail by way of the above-described embodiment, however, a person having ordinary skill in the art would understand that the present invention is not limited to the embodiment described in this description.

For example, the pico base station PeNB may be a femto base station forming a femto cell (Home eNodeB) or may be a relay station (Relay node). When the pico base station is the relay station, the relay station is connected to the macro base station MeNB via a radio link (backhaul link).

The present invention can be embodied in various modified or altered forms without departing from the sprit or scope of the present invention defined by claims. Accordingly, the description is given only for illustrative purposes and is by no means intended to limit the present invention.

The disclosure of Japanese Patent Application No. 2010-250144, filed on Nov. 8, 2010, including the specification, drawings, and abstract, is incorporated herein by reference in its entirety.

The invention claimed is:

1. A notification method by which a user terminal receives modification notification information for notifying modification in system information from a micro base station that is arranged in a macro cell formed by a macro base station and forms a smaller micro cell than the macro cell, the notification method comprising the steps of:
at the macro base station, notifying the micro base station of a subframe pattern including a protection subframe to protect the modification notification information for a plurality of radio frames; and
at the micro base station, notifying the user terminal of identification information of the protection subframe in the subframe pattern,
wherein the subframe pattern includes the protection subframe of 1 to 40 subframes,
wherein the identification information of the protection subframe is associated with a position of a measurement subframe in a measurement pattern set as a subset of the subframe pattern, and
wherein the modification notification information is included in one of SIB1 or a paging broadcasted from the micro base station.

2. The notification method of claim 1, wherein the modification notification information is included in a paging broadcasted from the micro base station in each of the plurality of radio frames and
the subframe pattern includes the protection subframe to protect the paging.

3. The notification method of claim 1, wherein the modification notification information is included in a SIB1 (System Information Block 1) and the subframe pattern includes the protection subframe to protect the SIB 1.

4. The notification method of claim 3, wherein the micro base station notifies the user terminal that the modification notification information should be obtained with reference to the SIB 1 during CRE (Ceil Range Expansion) in which a coverage of the micro cell is expanded.

5. The notification method of claim 1, wherein the identification information of the protection subframe comprises a bit map formed with 40 bits.

6. A user terminal that receives modification notification information for notifying modification in system information from a micro base station that is arranged in a macro cell formed by a macro base station and forms a smaller micro cell than the macro cell, the user terminal comprising:
a receiving section configured to receive identification information of a protection subframe in a subframe pattern notified from the macro base station to the micro base station, the protection subframe being for protecting the modification notification information for a plurality of radio frames and to receive broadcast information in the protection subframe,
wherein the subframe pattern includes the protection subframe of 1 to 40 subframes, wherein the identification information of the protection subframe is associated with a position of a measurement subframe in a measurement pattern set as a subset of the subframe pattern; and
wherein the modification notification information is included in one of SIB1 or a paging broadcasted from the micro base station.

7. A radio base station that is arranged in a macro cell formed by a macro base station and forms a micro cell which is smaller than the macro cell, comprising:
a receiving section configured to receive, from the macro base station, a subframe pattern including a protection subframe to protect modification notification information for notifying modification in system information for a plurality of radio frames; and
a notifying section configured to notify a user terminal of identification information of the protection subframe in the subframe pattern,
wherein the subframe pattern includes the protection subframe of 1 to 40 subframes,
wherein the identification information of the protection subframe is associated with a position of a measurement subframe in a measurement pattern set as a subset of the subframe pattern; and
wherein the modification notification information is included in one of SIB1 or a paging broadcasted from the micro base station.

8. A radio base station that forms a macro cell and is connected to a micro base station forming a micro cell that is smaller than the macro cell, comprising:
a notifying section configured to notify the micro base station of a subframe pattern including a protection subframe to protect modification notification information for notifying modification in system information for a plurality of radio frames, wherein the subframe pattern includes the protection subframe of 1 to 40 subframes,
wherein the identification information of the protection subframe is associated with a position of a measurement subframe in a measurement pattern set as a subset of the subframe pattern; and
wherein the modification notification information is included in one of SIB1 or a paging broadcasted from the micro base station.

9. The radio base station of claim 8, wherein the notifying section is configured to notify the micro base station of a shift amount to match the protection subframe to a subframe in which the micro base station transmits the modification notification information.

10. The notification method of claim 2, wherein the identification information of the protection subframe comprises a bit map formed with 40 bits.

11. The notification method of claim 2, wherein the identification information of the protection subframe is associated with a position of a measurement subframe in the measurement pattern set as a subset of the subframe pattern.

12. The notification method of claim 3, wherein the identification information of the protection subframe comprises a bit map formed with 40 bits.

13. The notification method of claim 3, wherein the identification information of the protection subframe is associated with a position of a measurement subframe in the measurement pattern set as a subset of the subframe pattern.

14. The notification method of claim 4, wherein the identification information of the protection subframe comprises a bit map formed with 40 bits.

15. The notification method of claim 4, wherein the identification information of the protection subframe is associated with a position of a measurement subframe in the measurement pattern set as a subset of the subframe pattern.

* * * * *